United States Patent Office 3,429,190
Patented Feb. 25, 1969

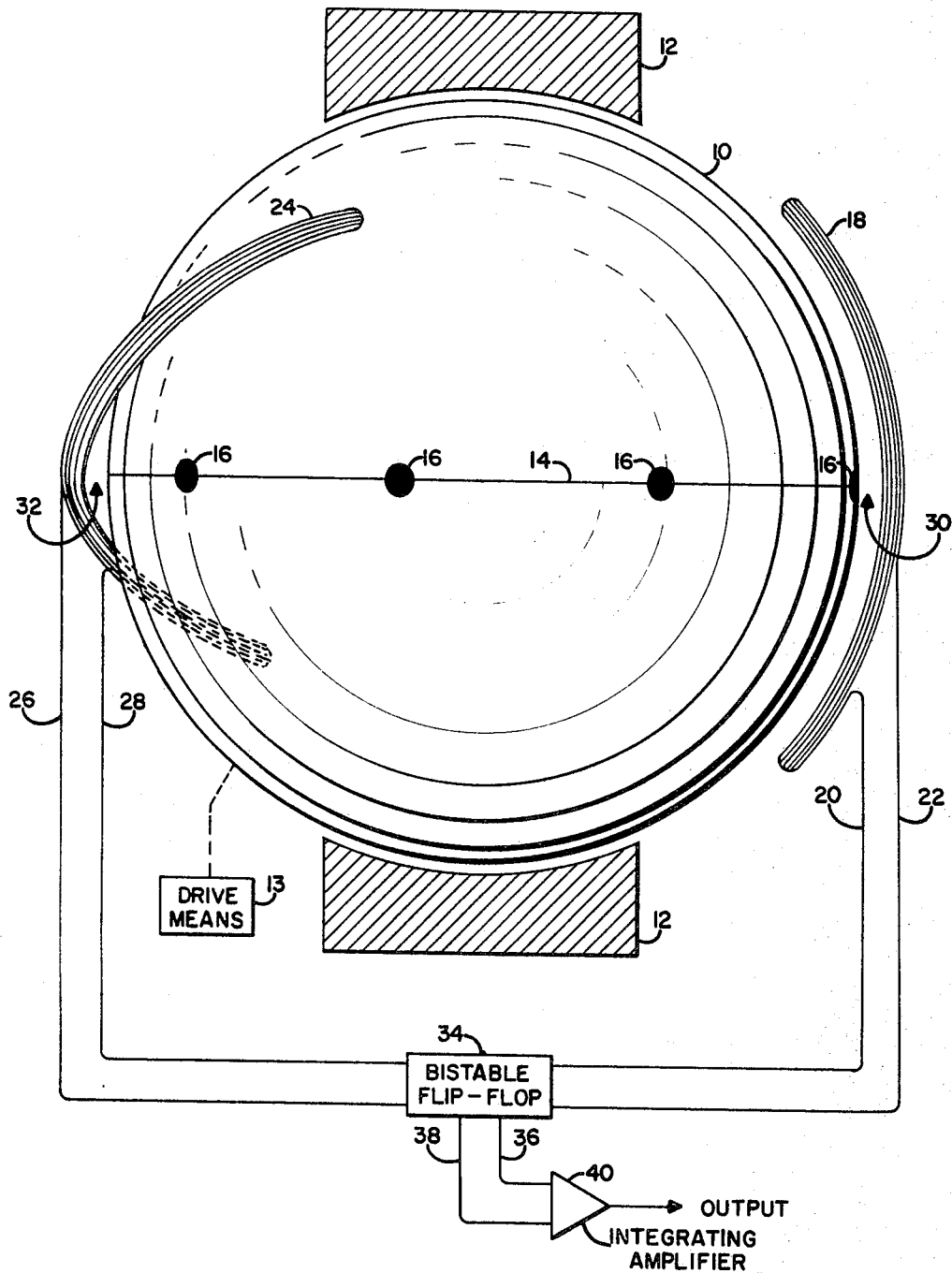

3,429,190
CONTROL APPARATUS
Henry A. Dinter, Minneapolis, Minn., assignor to Honeywell Inc., Minneapolis, Minn., a corporation of Delaware
Filed May 2, 1966, Ser. No. 546,795
U.S. Cl. 74—5.6
Int. Cl. G01c 19/28
3 Claims

ABSTRACT OF THE DISCLOSURE

Gyroscope pickoff apparatus in which two arc-shaped coils of wire are positioned on opposite sides of the gyroscope rotor so as to sense the passage of small magnetic inserts on the rotor. The coils are inclined with respect to each other so that the time of passage varies with the position of the rotor.

---

This invention pertains to means, in combination with a support and a spherically shaped rotor universally supported by said support and adapted to spin relative to said support about a spin axis, for sensing and measuring an inclination of the spin axis with respect to the support member. This invention has specific application to the field of gyroscopic instruments.

Briefly, the present invention comprises arc-shaped pickoff means disposed about the rotor so as to sense the passage of small magnetic inserts or triggering units mounted on the equator or the rotor. The pickoffs are orientated in different positions so that the time of passage of the magnetic inserts from one pickoff to the other pickoff varies in accordance with the position of the spin axis of the rotor. The time of passage of these magnetic inserts is measured by feeding the output signals from the pickoff sensing means to a bistable flip-flop circuit, as will be more completely described hereinafter.

It is an object of this invention, therefore, to provide an improved control apparatus and more specifically to provide an inexpensive pickoff for measuring the inclination of the spin axis of a universally supported spinning sphere with respect to its support.

Other and more specific objects of the invention, including constructional details, will be set forth more fully in the following specifications and appended claims, in conjunction with the accompanying drawing in which the preferred embodiment of my invention is schematically illustrated.

Referring to the drawing, a spherically shaped rotor element 10, universally supported relative to a support means 12 by any suitable means such as air bearings or the like, is shown. Rotor 10 is adapted to spin about a reference axis, not shown, under the influence of suitable drive means or rotation impelling means 13. Rotor 10 has an equator 14 upon which an odd number of small triggering units 16 are placed. For the preferred embodiment small magnetic inserts are used for triggering units 16. In the preferred embodiment shown, seven magnetic inserts are utilized of which four can be seen in the drawing. These inserts are evenly spaced about the equator of rotor 10 so as to define a circle about the spin axis. The center of the circle is coincident with the spin axis of rotor 10.

A long thin arc-shaped sensing means 18 is positioned close about the surface of rotor 10 so as to sense the passage of inserts 16 when rotor 10 is spinning about its spin axis. In the preferred embodiment arc-shaped sensing means 18 comprises a very thin coil of wire which will generate a voltage pulse on a pair of leads 20 and 22 when the small magnetic fields from inserts 16 cut through coil 18. Pickoff coil 18 is situated so that the geometric plane defined by coil 18 passes through the spin axis. Phrased differently, both the spin axis and coil 18 lie in the same plane. Consequently, if the spin axis or rotor 10 tilts within the plane of the drawing while the rotor is spinning the times at which inserts 16 pass under coil 18 do not vary.

A second arcuate sensing means 24, also shown here as a long thin arc-shaped coil is positioned on the opposite side of rotor 10. Like pickoff coil 18, pickoff coil 24 generates a signal on a pair of leads 26 and 28 each time a magnetic insert 16 passes underneath coil 24. However, unlike coil 18, coil 24 lies in a plane which is inclined with respect to the spin axis. Consequently, if the spin axis of rotor 10 tilts away from or toward coil 18 the times at which the inserts 16 are sensed by coil 24 do vary.

My invention operates in the following manner. As rotor 10 spins, the inserts 16 pass under points 30 and 32 proximate sensing coils 18 and 24. Since there are an odd number of magnetic inserts when one of the inserts is directly under coil 18, as shown in the drawing, there are no inserts under coil 24. Conversely, when one of the inserts passes under coil 24 there is no insert under coil 18. This results in coils 18 and 24 being alternately energized, so that a bistable flip-flop circuit 34 is caused to alternately switch from a positive output to a negative output.

When the spin axis rotor 10 is exactly vertical, as is the condition in the drawing, each of the magnetic inserts 16 generates a voltage pulse on coil 18 which causes bistable flip-flop 34 to switch to a positive output signal on a pair of leads 36 and 38. As rotor 10 continues to spin, a short while later a different magnetic insert 16 passes under coil 24 which generates a signal causing bistable flip-flop 34 to switch over to a negative output on leads 36 and 38. Since the spin axis is vertical, the length of the negative and positive pulses produced by bistable flip-flop 34 are equal so that when these pulses are integrated by an integrating amplifier 40 the resultant output is zero.

If the spin axis of rotor 10 is inclined slightly toward coil 18 so that the top of rotor 10 is closer to coil 18 the times at which signals will be generated in coil 18 do not change. Bistable flip-flop 34 is caused to generate a positive signal as described before. However, since coil 24 is inclined with respect to the spin axis the magnetic insert will arrive at coil 24 earlier, thus, switching flip-flop 34 to the negative condition earlier so that the positive pulse lasts for a shorter duration than when the spin axis is directly vertical. Consequently, integrating amplifier 40 will have a net negative output since the negative pulses will be longer than the positive pulses. Consequently, a negative output is indicative of an inclination of the spin axis toward the coil 18 and the magnitude of the signal is indicative of the amount of inclination.

If, on the other hand, the spin axis of rotor 10 is inclined toward coil 24 so that the top of rotor 10 is farther away from coil 18, again, the pulses from coil 18 will not change in time, but the inserts for turning off the positive pulses will arrive at coil 24 somewhat later since they have farther to travel. In this condition, positive pulses from flip-flop 34 will be longer in duration than negative pulses and integrating amplifier 40 will have a net positive output whose magnitude is proportional to the amount of inclination toward coil 24.

As is evident from the drawing the apparatus disclosed is primarily sensitive to inclinations of the spin axis which remain in the plane of the drawing. It should be understood, however, that two more sensing coils may be utilized on the front and back of rotor 10 in conjunction with timing means similar to flip-flop 34 and amplifier 40 so that inclinations of the spin axis which are in and out of the plane of the paper may be accurately measured. Furthermore there are many other modifications and variations which will occur to those skilled in the art. For example, inserts 16 may be replaced by small light reflecting surfaces and coils 18 may be replaced by long thin illuminated slits through which light detectors could sense passing of the reflecting units. In fact, broadly speaking, inserts 16 could be replaced by any type of convenient triggering unit which may be used to trigger any appropriate arcuate sensing unit. Any number of triggering units may be used by offsetting the sensing units slightly for an even number of units. In addition, many variations may be made to the circuit described in order to provide a time means for timing the pulses generated by sensing means 18 and 24. Therefore, I do not intend to limit the invention to the particular form or embodiments shown and I intend in the appended claims to cover all modifications, which do not depart from the spirit and scope of my invention.

What I claim is:

1. In apparatus of the class described:

support means;

a spherically shaped rotor having an equator and being adapted for rotation relative to said support means about a spin axis perpendicular to the plane of said equator;

means for rotating said rotor; and means for measuring the relative position of the spin axis with respect to said support means, said measuring means comprising an odd number of triggering units equally spaced about the equator of said rotor;

first arc-shaped sensing means mounted on said support means and lying proximate to the surface of the rotor in a first plane, said first plane also containing said spin axis, said first sensing means operable to provide a first signal indicative of the passing of said triggering unit;

second arc-shaped sensing means mounted on said support means and lying proximate to the surface of said rotor in a second plane which is inclined with respect to said first plane, said second sensing means operable to provide a second signal indicative of the passing of said triggering unit; and timing means operable to receive and time said first and second signals so as to determine the inclination of said spin axis with respect to said support means.

2. The apparatus of claim 1 in which said triggering units comprise magnetic field producing means;

said first and second arc-shaped sensing means comprise thin wire coil on opposite sides of the rotor; and said timing means comprises circuitry connected to said wire coils to receive the electrical signals therefrom produced by the passage of magnetic flux from said magnetic field producing means through said coils.

3. The apparatus of claim 2 in which said magnetic field producing means comprises magnetic inserts and said timing circuitry includes a flip-flop circuit operable to produce a first output upon receiving a signal from said first sensing means and a second output upon receiving a signal from said second sensing means, and integrating means operable to receive and integrate said first and second outputs from said flip-flop to produce a net output signal of a polarity depending on the direction of the inclination of the spin axis and of a magnitude proportional to the amount of inclination of the spin axis.

References Cited

UNITED STATES PATENTS

| | | | |
|---|---|---|---|
| 3,071,976 | 1/1963 | Kunz | 74—5.6 |
| 3,252,340 | 5/1966 | Watt | 74—546 |
| 3,301,071 | 1/1967 | Shalloway | 74—5.6 |
| 3,323,378 | 6/1967 | Powell | 74—5.6 |

C. J. HUSAR, *Primary Examiner.*